Patented July 4, 1950

2,514,156

UNITED STATES PATENT OFFICE 2,514,156

SUBSTITUTED PYRANS

Bradford P. Geyer and Robert H. Mortimer, Berkeley, Calif., assignors to Shell Development Company, San Francisco, Calif., a corporation of Delaware No Drawing. Application December 20, 1946, Serial No. 717,618

17 Claims. (Cl. 260—333)

This invention relates to the condensation of acrolein in an aqueous medium, and to a product of such condensation. More particularly, the present invention relates to the formation of products of the condensation of acrolein in a strongly acidic aqueous medium. Specifically, the present invention pertains to certain novel compounds in the pyran series obtainable through reaction of acrolein with a highly acidic aqueous medium, and to related novel compounds in the pyran series of compounds advantageously derived therefrom.

The process of the present invention is executed by condensing acrolein in an acidic aqueous medium at a suitably elevated temperature for a period of time determined by the correlated conditions of reaction temperature and acidity of the aqueous reaction medium. In accordance with the present invention there is provided by means of the hereindescribed process a novel class of compounds in the pyran series of compounds characterized by having a hydroxymethyl or a carbonyl group substituted at the 3-position of the pyran ring and having no substituent groups other than hydrogen attached to the pyran nucleus. The compounds that are provided in accordance with the present invention are of considerable value in themselves for application in the various arts, as, for example, solvents, plasticizers, homogenizers, and the like. They also are of noteworthy value as raw materials for the preparation of a wide variety of chemical compounds or as reactive ingredients of various compositions.

The process of the present invention is effected by heating acrolein in the presence of an acidic aqueous medium. The aqueous medium must be acidic because entirely different reaction products are obtained in the presence of alkali. The aqueous medium may be rendered acidic by a wide variety of acidic compounds. Preferably, however, there is employed a strong acid, and in the most preferable cases a strong mineral acid. As acidifying agent there may be employed, in the broader aspects of the invention, acid materials such as monochloroacetic acid, oxalic acid, di- or trichloroacetic acid, phosphoric acid, hydrochloric acid, sulfuric acid, and the like. The strong mineral acids, particularly hydrochloric acid and sulfuric acid, have been found to lead to the most advantageous results and, therefore, are preferred. The acidifying material should be present in amounts sufficient to impart a relatively high acidity to the aqueous medium. Amounts of the acid material sufficient to impart a pH of 0 or less thus are desirable. In the case of the strong mineral acids, acid concentrations in the aqueous medium of from about 1 normal to about 6 normal may be employed effectively, the more limited range of concentration of from about 2 normal to about 5 normal being preferred. Other acid materials are employed in amounts sufficient to provide an equivalent degree of acidity in the aqueous medium.

The relative proportions of acrolein and aqueous medium may be varied as desired throughout a relatively wide range. There desirably is employed not less than about 0.5 part by weight of the aqueous medium per part of acrolein. Satisfactory results generally have been obtained through the use of up to about 50 parts by weight of aqueous medium per part by weight of acrolein, while in the preferred cases there is employed from about 1 to about 7 parts by weight of aqueous medium per part of acrolein.

If desired, there may be included in the reaction mixture a small amount, say from about 0.1 to about 5 per cent by weight of the acrolein, of any of the known antioxidants such as hydroquinone, that are effective in preventing the polymerization of unsaturated aldehydes. It has been discovered, however, that the present process may be effected in either the absence or the presence of such antioxidants, or polymerization inhibitors, without detriment to the outcome thereof. The presence of antioxidants such as hydroquinone is known to prevent, or to reduce, the tendency of the unsaturated aldehydes to polymerize. It therefore was unexpected to discover that the present process, which from certain aspects is one of polymerization to form dimeric products, is not influenced significantly by such antioxidants, or polymerization inhibitors. Contrary to what would be anticipated, the process of the present invention thus can be practiced effectively when there is present an amount of antioxidant that otherwise would be regarded as sufficient to prevent polymerization of the aldehyde. In actual practice, because commercially available acrolein ordinarily contains a minor amount of, say, hydroquinone, it generally is most convenient to carry out the process in the presence of such an antioxidant, although it will be appreciated that its presence is not a prerequisite to the successful execution of the process.

In practicing the process of the present invention the acrolein preferably is employed as the sole aldehyde reactant in the condensation process of the present invention. However, in certain cases part of the acrolein, if desired, may be replaced by one or more other alpha-beta unsaturated aldehydes or by hydroxy aldehydes, generally not over about 50% of the acrolein being thus replaced. As the second aldehyde, if one is employed, there advantageously is used one having a substantial solubility in the aqueous medium under the conditions of reaction. Suitable unsaturated or hydroxy aldehydes which thus may be employed are, for example, methacrolein, crotonaldehyde, beta-hydroxypropionaldehyde, aldol, alpha-ethylacrolein, and homologous and analogous aldehydes possessing a substantial solubility in the reaction medium under the reaction conditions.

The condensation process of the present invention is effected by heating the acrolein in the presence of the aqueous medium at an elevated temperature sufficient to promote the desired condensation reaction but insufficient to cause undesired further or side reactions. The process of the present invention thus most desirably is effected at temperatures not over about 100° C., and preferably at somewhat lower temperatures. It has been found that at insufficiently high temperatures the reaction of acrolein either is undesirably slow or proceeds in a manner leading to results other than those desired in accordance with the objects of the present invention. The temperature of reaction should be above room temperature, and preferably may be within the more limited range of from about 40° C. to about 70° C. A convenient mode of operation is to reflux a reaction mixture comprising acrolein and the aqueous medium, thereby carrying out the reaction at the reflux temperature of the reaction mixture. If, as in a preferred case, it is desired to employ a reaction temperature below the ultimate reflux temperature of the aqueous mixture, a suitable inert medium having a boiling point within the desired temperature range may be included in the reaction mixture and the process effected at the boiling point thereof. Toluene, benzene and other inert organic solvents may thus be used. The presence of such inert organic solvents does not alter the outcome of the present process, since they are added merely to facilitate regulation of the temperature. Other means for regulating the reaction temperature may be employed, if desired, and will be apparent to those skilled in the art.

The reaction time necessary to effect the desired reaction in the process of the present invention generally is a function of the other existing conditions and may be varied widely. Generally speaking, satisfactory yields of the present condensation product of acrolein may be obtained by continuing the reaction for not over about 12 hours, although longer reaction periods may be employed if desired. Under optimum conditions, satisfactory yields of the desired reaction product may be obtained with reaction times of 1 hour or less.

The process of the present invention may be effected either batchwise or continuously. In the case of batchwise operation, the acrolein and the aqueous medium may be introduced into a suitable reaction vessel and heated together at the desired temperature for the requisite time. Continuous operation of the present process may be effected, for example, by passing the ingredients of the reaction mixture in the proper proportions through an elongated reaction zone such as a reaction tube immersed in a heating medium or otherwise maintained at the desired temperature.

The process of the present invention may be effected at either superatmospheric or subatmospheric pressures. Generally, however, it is most convenient to employ pressures at or near atmospheric pressure.

After completion of the reaction, the products of reaction may be separated or purified in any suitable manner, such as by distillation, by treatment with selective solvents, etc. A preferred mode of operation comprises neutralization of any acid present, and extraction of the neutralized reaction mixture with an immiscible organic solvent such as ethyl ether, or the like. If desired, the organic solvent then may be removed from the extract and the organic material in the extract further purified as by fractional distillation under reduced pressure or by similarly effective means.

When acrolein is employed as the sole reactant in the process of the present invention, there may be recovered in good yield from the reaction mixture, as by fractional distillation, a mobile, substantially colorless, liquid product with a characteristic aldehyde odor and characterized by a boiling point of about 49.2° C. at 1 millimeter mercury pressure and about 199° C. to 200° C. at 760 millimeters mercury pressure, a refractive index ($n_D^{20}$) of about 1.4955, and a density ($d_{20}^4$) of about 1.114. This product forms a semicarbazone melting at about 205° C. to 206° C. (after recrystallization from alcohol), and exhibits strong infra-red absorption bands at wave lengths 5.995 microns and 6.11 microns.

The novel product thus characterized has been found to have a structure corresponding to the structural formula

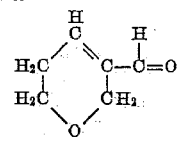

or, in other words, to be the novel compound 5,6-dihydro-1,2-pyran-3-carboxaldehyde. It is characterized by having a carbonyl group substituted at the 3 position of the pyran ring and by having no other substituent groups other than hydrogen attached to the pyran nucleus. This novel compound is a valuable compound. It is a distinctive compound in the pyran series because it contains the formyl group at the 3 position of the ring and contains no other substituent group other than hydrogen in the pyran nucleus. It furthermore is characterized by containing the conjugated structure C=C—C=O which renders its reactivity characteristically different from substituted pyrans not containing double bonds in conjugated relationship. Because of these and other desirable characteristics, 5,6-dihydro-1,2-pyran-3-carboxaldehyde is of particular value for the preparation of a wide variety of chemical compounds not heretofore prepared or otherwise not readily obtainable. The preparation of certain of these novel compounds, and the novel compounds themselves, constitute a further aspect of the present invention which is referred to in greater detail hereinafter.

In accordance with the process of the present invention, the product in the pyran series resulting from the condensation of acrolein in an acidic aqueous medium may be oxidized and/or hydrogenated (reduced) to provide valuable new, related compounds in the pyran series of compounds. The condensation product, either in crude state or in a more highly purified form, may be oxidized, with or without hydrogenation of the pyran nucleus, to the corresponding carboxylic acid compounds. By suitable reduction, either the pyran ring may be saturated with hydrogen without alteration of the formyl group, or the formyl group may be reduced to the primary hydroxymethyl group, with or without saturation with hydrogen of the olefinic linkage of the dihydropyran ring.

In accordance with the present invention, 5,6-dihydro-1,2-pyran-3-carboxaldehyde advantageously may be oxidized and/or hydrogenated (reduced) to provide valuable new compounds of the general class of pyran derivatives wherein there is a carbonyl group or a hydroxymethyl group substituted at the 3 position of the pyran ring, the pyran ring having attached thereto no other substituent group other than hydrogen. The novel compounds falling within this general class may be characterized by the general structural formula

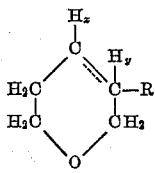

wherein R represents a substituent group selected from the class consisting of the hydroxymethyl, the formyl, and the carboxyl radicals, $x=1$ or 2, and $y=x-1$, the carbon atoms being joined by a double bond when $x=1$ and by a single bond when $x=2$ (as indicated by the broken line therebetween).

The oxidation and/or reduction may be effected in various ways in accordance with the present invention. The 5,6-dihydro-1,2-pyran-3-carboxaldehyde thus may be oxidized or reduced, either directly or indirectly but without alteration of the pyran nucleus, to provide the corresponding novel dihydropyran derivatives 5,6-dihydro-1,2-pyran-3-carboxylic acid

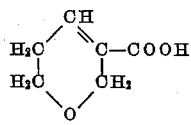

and 5,6-dihydro-1,2-pyran-3-methanol

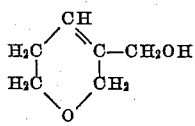

respectively, corresponding to the general formula given above when $x$ equals 1. With hydrogenation of the double bond in the pyran ring, the novel corresponding tetrahydropyran derivatives, tetrahydropyran-3-carboxylic acid

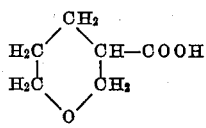

and tetrahydropyran-3-methanol

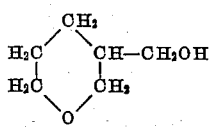

respectively, are obtained ($x=2$ in the general formula). Reduction of the pyran ring without change in the formyl group, on the other hand, provides the aldehyde, tetrahydropyran-3-carboxaldehyde

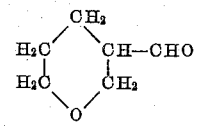

Various means advantageously may be employed for effecting the reduction or oxidation of the acrolein condensation product in accordance with the process of the present invention. For example, reduction of the acrolein condensation product may be effected by treatment with hydrogen, by means of a chemical reducing agent, by electrolytic means, or otherwise. A particularly advantageous means of effecting reduction involves direct treatment of the dihydropyran compounds, in either the crude state or a highly refined state, with molecular hydrogen, in the presence of a suitable catalyst if desired. The condensation product thus may be suspended or dispersed in a suitable inert medium such as an inert solvent medium and hydrogenated by direct contact with molecular hydrogen in the presence of a suitable catalyst. Water or suitably inert organic solvents such as diethyl ether, isopropyl ether, and analogous ethers; methanol, ethanol, isopropanol, and other alcohols; hydrocarbons such as normally liquid aliphatic hydrocarbons or normally liquid aromatic hydrocarbons, etc., thus desirably may be employed as the dispersing or suspending medium. If, as is preferred, a hydrogenation catalyst is employed, any suitable hydrogenation catalyst such as finely divided platinum, palladium, nickel, and the like may be used. A highly satisfactory catalyst for effecting the hydrogenation is the nickel catalyst known as Raney nickel and prepared according to the Raney patent, U. S. Patent 1,628,190. Hydrogen pressures of from about 100 to about 10,000 pounds per square inch may be used, a particularly suitable range of hydrogen pressures being from about 500 to about 2000 pounds per square inch. Elevated temperatures may be employed for effecting hydrogenation, temperatures of from about 20° C. to about 200° C. being particularly satisfactory. After hydrogenation treatment the catalyst may be removed as by filtration and the suspending medium separated, and the hydrogenation product more highly purified by fractional distillation under reduced pressures or by any other suitable treatment.

It has been found that the use of lower temperatures during the hydrogenation treatment, say from about 20° C. to about 50° C. favors the formation of the saturated aldehyde tetrahydropyran-3-carboxaldehyde as the principal product of reaction. Higher temperatures, from 100° C. upwards, favor the formation of the saturated alcohol tetrahydropyran-3-methanol to the substantial exclusion of the corresponding saturated aldehyde. The present invention thereby provides an advantageous method whereby either one or the other of these valuable compounds may be prepared in an efficient manner and in highly satisfactory yields from the single compound 5,6-dihydro-1,2-pyran-3-carboxaldehyde by direct hydrogenation treatment.

If desired, the hydrogenation may be effected advantageously without the use of a suspending or dispersing medium for the substrate, the liquid formyl pyran being contacted directly with the hydrogenation catalyst in any desired form in the presence of hydrogen under the foregoing conditions of temperature and pressure, etc.

Alternatively, reduction or hydrogenation of the 5,6-dihydro-1,2-pyran-3-carboxaldehyde may be effected by chemical means, as by treatment with a reducing agent, or electrolytically, as by electrolysis in a suitable conducting medium.

Direct treatment of the 5,6-dihydro-1,2-pyran-3-carboxaldehyde with hydrogen generally tends to saturate the pyran ring, thereby forming tetrahydropyran derivatives. If it is desired to obtain, for example, the unsaturated derivative 5,6-dihydro-1,2-pyran-3-methanol, it may be desirable to prevent undesired reaction at the double bond of the pyran ring as by addition of substituent radicals or atoms thereto that are stable under the hydrogenation conditions, the substituent radicals or atoms being removable after reduction of the formyl group to the hydroxy-methyl group.

It unexpectedly has been found that the 5,6-dihydro-1,2-pyran-3-carboxaldehyde may be reduced to 5,6-dihydro-1,2-pyran-3-methanol with a minimum of degradative or other side reactions such as hydrogenation of the dihydropyran ring, by effecting reduction thereof chemically, as by treatment with a suitable chemical reducing agent. Suitable chemical reducing agents which may be employed comprise in particular the alcoholates of the polyvalent metals of the third series of the Periodic Table of the elements, such as the lower aliphatic alcoholates formed by reaction of magnesium or aluminium with ethyl alcohol, propyl alcohol, or the like. The reduction may be effected, for example, by heating a mixture comprising the 5,6-dihydro-1,2-pyran-3-carboxaldehyde, the alcoholate, and an alcohol, preferably the one corresponding to the alcoholate, at an elevated temperature, from say 35° C. to 75° C., until completion of the reaction is evident. The alcoholate may be employed in an amount either greater or less than the stoichiometric equivalent of the dihydropyrancarboxaldehyde although it preferably is employed in moderate excess, an amount of the alcoholate from about 10% to about 50% in excess of the stoichiometric equivalent of the dihydropyrancarboxaldehyde being particularly effective. The alcohol desirably is present in an amount sufficient to provide a readily mobile reaction mixture, amounts of alcohol corresponding to from about one to about five times the weight of the dihydropyrancarboxaldehyde being suitable, although larger or smaller amounts may at times be employed if desired. Lower boiling products of the reaction may be distilled continuously from the reaction mixture during reaction, and cessation of their formation may be used as a guide to indicate completion of the reaction. After the reduction is completed, the 5,6-dihydro-1,2-pyran-3-methanol may be recovered from the reaction mixture in any suitable manner, as by acidifying the mixture and extracting the acidified mixture with a suitable organic solvent such as diethyl ether. The 5,6-dihydro-1,2-pyran-3-methanol may be recovered from the ethereal extract by distillation or by other effective methods that will be apparent to those skilled in the art.

Oxidation of the unsaturated condensation product to the corresponding acid may be effected by treatment thereof with any mild oxidizing agent capable of oxidizing the formyl group to the carboxyl group and that does not also break the pyran ring at the double bond or elsewhere. The oxidizing agent may be, for instance, silver oxide, oxygen, air, oxygen-enriched air, ozone, etc., silver oxide being a preferred agent. Oxidation of the 5,6-dihydro-1,2-pyran-3-carboxaldehyde may be effected in either an organic solvent medium or in an aqueous medium. A particularly effective mode of operation comprises treatment of the dihydropyran carboxaldehyde in an alcohol-water medium with silver oxide produced in situ by interaction of silver nitrate and added barium hydroxide. Alternatively, the oxidation may be effected by treatment of the formyl compound dissolved in an organic solvent such as ethyl ether, with an oxidizing agent such as dry, preformed silver oxide in amounts sufficient to effect oxidation of the formyl group to the carboxyl group. After the oxidation treatment, the carboxylic acid product of oxidation advantageously may be recovered as by acidifying the reaction mixture with hydrochloric acid, separating insoluble silver and silver salts, and crystallizing the free acid from an organic solvent solution thereof.

An alternative, preferred method of oxidizing the present dihydropyrancarboxaldehyde to the corresponding carboxylic acid comprises aerating the aldehyde with gaseous oxygen, preferably in the presence of a catalyst for the oxidation reaction such as a catalytically active metal or a compound of a metal. Compounds of manganese, vanadium, nickel, iron, chromium and/or other metals may be employed as the catalyst, organic compounds of the foregoing metals that are soluble in organic solvents being particularly satisfactory. A preferred class of catalytic materials comprises the organic chelated salts of cobalt and manganese, cobalt acetylacetonate being particularly active. The oxidation of the present dihydropyrancarboxaldehyde to the corresponding carboxylic acid may be effected in an organic solvent medium as by dissolving the aldehyde and an effective amount of the catalyst, say from about 0.05 to about 5% by weight of the aldehyde, in a suitable organic solvent such as acetic acid or mixtures of organic acid solvents with other organic solvents, and contacting, or aerating the solution with an oxygen-containing gas. Temperatures from room temperatures upwards to 100° C. or higher may be employed. After completion of the oxidation reaction, the catalyst and solvent may be removed as by precipitation, distillation, etc., and the carboxylic acid formed purified by fractional distillation, by crystallization of a salt thereof, or otherwise.

The preparation of the saturated acid tetrahydropyran-3-carboxylic acid may be effected either by oxidation of the corresponding formyl derivative tetrahydropyran-3-carboxaldehyde or by hydrogenation of the pyran nucleus of the unsaturated acid 5,6-dihydro-1,2-pyran-3-carboxylic acid. The saturated acid thus may be obtained from 5,6-dihydro-1,2-pyran-3-carboxaldehyde either by first hydrogenating the aldehyde and then oxidizing the resultant hydrogenation product to the acid, or by first oxidizing the aldehyde to the unsaturated acid and then hydrogenating the pyran nucleus of the oxidation product to provide the saturated acid. Although either mode of procedure may be employed in accordance with the present invention, it has been found that preparation of the saturated formyl derivative and its subsequent oxidation to the acid compound generally is more readily effected, and hence is preferred.

If it is desired to hydrogenate the unsaturated acid 5,6-dihydro-1,2-pyran-3-carboxylic acid to the corresponding saturated carboxylic acid, the hydrogenation may be effected by treating the unsaturated acid with molecular hydrogen in the presence of an active hydrogenation catalyst such as Raney nickel or other nickel catalyst, a noble metal catalyst, such as platinum or palladium, or other hydrogenation catalysts comprising a catalytically active metal or compound of a metal. If, as in the preferred case, it is desired to prepare the saturated acid tetrahydropyran-3-carboxylic acid by oxidation of tetrahydropyran-3-carboxaldehyde, any oxidizing agent adapted to oxidation of a formyl group to a carboxyl group may be employed in accordance with methods known to the art. Suitable agents comprise for instance hydrogen peroxide in an alkaline medium, silver oxide, alkaline cupric tartrate, sodium dichromate, potassium permanganate, molecular oxygen catalyzed by the presence of catalytically active metals or metal salt, and similar agents.

The compounds in the pyran series provided by the present invention possess desirable characteristics that render them of value in the arts. They are of value as intermediates in the preparation of solvents, insecticides, plasticizers, antibiotics, textile assistants, and the like. The carboxaldehydes of the present invention, particularly the dihydropyran carboxaldehyde, are of considerable value for use as ingredients of synthetic resins, either alone or reacted with suitable resinifying agents. The compounds also are of particular value as intermediates for the production of a wide variety of useful chemical derivatives. The alcohols may be converted to valuable new esters, as by reaction with a suitable organic or inorganic acid or other esterifying agent. Among the esters which thus may be prepared advantageously are, for example, the acetates, the propionates, the benzoates, the butyrates, the acrylates, the methacrylates, and other acyl esters of 5,6-dihydro-1,2-pyran-3-methanol and of tetrahydropyran-3-methanol. The present hydroxymethyl compounds also find utility as raw materials for the preparation of amines, as by either direct or indirect replacement of the hydroxyl group with ammonia or a primary or secondary nitrogen atom, whereby primary, secondary, or tertiary amines, respectively, may be obtained Derivative of the present carboxylic acids which may be prepared and which find numerous useful applications in the arts include, for example, the acid halides, the amides, wherein the nitrogen atom may be either primary, secondary, or tertiary in character, and esters of the carboxylic acids with alcohols such as aliphatic, aromatic, alicyclic, olefinic, and other alcohols. As specific examples of these derivatives of the present acids, there may be mentioned tetrahydropyran-3-carboxamide, N - ethyltetrahydropyran - 3 - carboxamide, N-acetyl-5,6-dihydro-1,2-pyran-3-carboxamide, N,N - dipropyl - 5,6 - dihydro-1,2-pyran-3-carboxamide, N-allyl - 5,6 - dihydro-1,2-pyran-3-carboxamide, tetrahydropyran - 3-carbonyl chloride, 5,6-dihydro-1,2-pyran-3-carbonyl bromide, etc., and esters such as the ethyl, allyl, propyl, butyl, benzyl, phenyl, cyclohexyl and other esters of tetrahydropyran-3-carboxylic acid and of 5,6-dihydro-1,2-pyran-3-carboxylic acid. The carboxaldehydes of the present invention also find further useful application in the preparation of products formed by condensation reactions, such as reactions leading to the formation of acetals, thioacetals, oximes, hydrazines, as well as higher condensation products such as resins.

It will be evident that the specific characteristics, chemical and/or physical, of these and similar derivatives of the present compounds will vary, both between the different classes or members of the classes of derivatives, and between the dihydropyran and the tetrahydropyran derivatives within any one class. A wide variety of chemical compounds thus may be prepared utilizing the products of the present invention that, because of their specific chemical and physical properties, find wide utility in the various arts.

The following examples will serve to illustrate certain specific embodiments of the present invention. It will be appreciated that such examples are given only for the purpose of illustration, and not with the intent of limiting the scope of the present invention which is defined by the appended claims.

EXAMPLE I

Preparation of 5,6-dihydro-1,2-pyran-3-carboxaldehyde

One hundred sixty-eight parts by weight of acrolein, 840 parts of water, 169 parts of 12 normal hydrochloric acid solution, and 86.6 parts of toluene were heated together with vigorous stirring in a glass reaction vessel at reflux temperatures for 60 minutes. During heating the temperature remained within the range of about 55° C. to 70° C.

The mixture then was cooled, neutralized with lead carbonate ($2PbCO_3.Pb(OH)_2$), solid material was removed by filtration, and the separated solution extracted with ethyl ether. The ethyl ether extract was freed of water and fractionally distilled at 5 millimeters mercury pressure. Forty-three parts of 5,6-dihydro-1,2-pyran-3-carboxaldehyde were recovered in a conversion of 26% and yield of 32%. The 5,6-dihydro-1,2-pyran-3-carboxaldehyde was found to have a boiling point of about 49.2° C. under a pressure of 1 millimeter of mercury, a refractive index ($n_D^{20}$) of about 1.4955, and a density ($d_{20}^4$) of about 1.114.

EXAMPLE II

Preparation of tetrahydropyran-3-carboxaldehyde

Fourteen parts of Raney nickel catalyst were suspended in a solution of 109 parts of 5,6-dihydro-1,2-pyran-3-carboxaldehyde in 80 parts of ethanol (absolute), and the mixture was subjected to the action of hydrogen gas at a hydrogen pressure of 1000 pounds per square inch and a temperature of 20° C. to 30° C., until one equivalent of hydrogen was absorbed. The catalyst was removed by filtration, and the product was fractionally distilled under reduced pressure. Tetrahydropyran-3-carboxaldehyde, distilling at 54° C. to 55° C. under a pressure of 7 millimeters of mercury, was recovered in a conversion of 52%. The tetrahydropyran-3-carboxaldehyde was found to have a boiling point of 179° C. to 181° C. under a pressure of 761 millimeters of mercury, and to have a refractive index ($n_D^{20}$) of 1.4578 and a density ($d_{20}^4$) of 1.0609.

EXAMPLE III

Preparation of tetrahydropyran-3-methanol

A solution of 50 parts of 5,6-dihydro-1,2-pyran-3-carboxaldehyde in 80 parts of ethanol (absolute) was subjected in the presence of Raney nickel catalyst to the action of hydrogen gas at 1000 pounds per square inch for one hour at 100° C. and then at 150° C. for six hours. After removal of the catalyst and the ethanol, tetrahydropyran-3-methanol was recovered in a yield in excess of 85 per cent by subjecting the product of hydrogenation to distillation under reduced pressure. The tetrahydropyran-3-methanol was found to have a boiling point of 68° C. to 69° C. under a pressure of about 2 millimeters of mercury, a refractive index ($n_D^{20}$) of 1.4629, and a density of ($d_{20}^4$) of 1.040.

EXAMPLE IV

*Preparation of 5,6-dihydro-1,2-pyran-3-carboxylic acid*

Ten parts by weight of 5,6-dihydro-1,2-pyran-3-carboxaldehyde, prepared as in Example I, were mixed with a solution of 46 parts of silver nitrate in aqueous ethanol containing 245 parts of water and 300 parts of ethanol. There were added 1150 parts of 0.32 normal barium hydroxide solution, 550 parts being added initially and the remainder in 50-part portions at 10-minute intervals. After 28 hours, the solution was filtered, the aqueous ethanol was evaporated, and the residue remaining was acidified. The free acid, 5,6-dihydro-1,2-pyran-3-carboxylic acid, was recovered in the form of soft, white crystals by evaporation of an ethereal extract of the acidified residue. The p-bromophenacyl ester of the acid was prepared. After two recrystallizations from absolute ethanol, the ester was obtained as colorless, plate-like crystals, melting at 86.8 to 87.2° C.

EXAMPLE V

*Preparation of 5,6-dihydro-1,2-pyran-2-methanol*

Forty parts of 5,6-dihydro-1,2-pyran-3-carboxaldehyde were added to a solution of aluminum isopropoxide prepared by reaction 3.86 parts of finely divided metallic aluminum with 76 parts of isopropyl alcohol in the presence of mercuric chloride and iodine. The reaction mixture was placed in a reaction vessel equipped with a fractionating column and heated with distillation of acetone until no more acetone was evolved. The cooled reaction mixture was acidified with 10 per cent aqueous sulfuric acid and extracted with ether. 5,6-dihydro-1,2-pyran-3-methanol was recovered in 44 per cent yield from the ethereal extract by fractional distillation under reduced pressure. It was a colorless, pleasant-smelling liquid and was found to have a boiling point of 83° C. under a pressure of 2 millimeters of mercury and a refractive index ($n_D^{20}$) of 1.4910.

EXAMPLE VI

*Preparation of tetrahydropyran-3-carboxylic acid*

Fifty-two parts of tetrahydropyran-3-carboxaldehyde, prepared as in Example II, were dissolved in 105 parts of glacial acetic acid containing in solution 0.25 part of cobalt acetylacetonate. A stream of oxygen gas was passed into and through the solution until completion of the reaction was indicated by a decrease in the intensity of the color of the solution. The maximum temperature of the reaction mixture during the reaction was 78° C. The acetic acid was evaporated under reduced pressure and the residue was subjected to flash distillation in a distillation vessel suitable for distillations from mixtures containing solid matter. After one redistillation, tetrahydropyran-3-carboxylic acid was recovered as a pale yellow oil with a refractive index ($n_D^{20}$) of 1.4642 and a boiling point of 79° to 81° C. under a pressure of about 1 millimeter of mercury.

We claim as our invention:

1. As a new chemical compound, a dihydropyran derivative having a structure represented by the structural formula

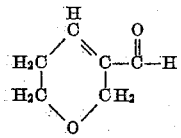

2. As a new chemical compound, a dihydropyran derivative having a structure represented by the structural formula

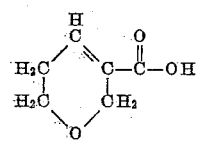

3. As a new chemical compound, a dihydropyran derivative having a structure represented by the structural formula

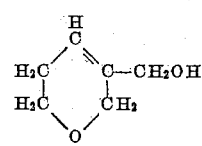

4. As new chemical compounds, the members of the class of pyran derivatives having a structure represented by the structural formula

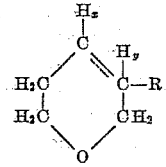

wherein R represents a substituent radical selected from the group consisting of the hydroxymethyl, the formyl, and the carboxy radicals, $x=1$ or $2$ and $y=x-1$.

5. As a new chemical compound, a compound according to claim 4 wherein $x$ has a value of 1.

6. As new chemical compounds, those compounds in the series of dihydropyran derivatives having one, but not more than one, extra-nuclear substituent group attached to atoms of the dihydropyran ring, said extra-nuclear substituent group comprising a carbonyl group directly bonded to the carbon atom in the 3 position of the dihydropyran ring, the double bond of the carbonyl group being in conjugate relation to an olefinic bond in the dihydropyran ring in the 3,4 position thereof.

7. A process of preparing 5,6-dihydro-1,2-pyran-3-methanol comprising reacting 5,6-dihydro-1,2-pyran-3-carboxaldehyde with an alcoholate of a polyvalent metal of the third series of the periodic table.

8. A process of preparing a pyran derivative having a substituent radical other than hydrogen attached to the carbon atom in the 3-position only of the pyran ring, comprising the steps of heating acrolein in the presence of an aqueous acidic medium having an acidity corresponding to from about 1 normal to about 6 normal hydrochloric acid, thereby forming 5,6-dihydro-1,2-pyran-3-carboxaldehyde, and subjecting said 5,6-dihydro-1,2-pyran-3-carboxaldehyde to the action of hydrogen gas under conditions of elevated temperature and hydrogen pressure and in the presence of a hydrogenation catalyst.

9. A process of preparing a pyran derivative having a substituent radical other than hydrogen attached to the carbon atom in the 3 position only of the pyran ring, comprising the steps of heating acrolein in the presence of an aqueous acidic medium having an acidity corresponding to up to about 6 normal hydrochloric acid, thereby forming 5,6-dihydro-1,2-pyran-3-carboxaldehyde, and subjecting said 5,6-dihydro-1,2-pyran-3-carboxaldehyde to the action of a reducing agent.

10. A process of preparing a pyran derivative having a substituent radical other than hydrogen attached to the carbon atom in the 3 position only of the pyran ring, comprising the steps of heating acrolein in the presence of an aqueous acidic medium having an acidity corresponding to up to about 6 normal hydrochloric acid, thereby forming 5,6-dihydro-1,2-pyran-3-carboxaldehyde, and subjecting said 5,6-dihydro-1,2-pyran-3-carboxaldehyde to the action of an oxidizing agent effective for converting a formyl group to a carboxyl group.

11. A process which comprises heating in the presence of a polymerization inhibitor a mixture of acrolein with an aqueous solution of a strong mineral acid which solution has an acidity corresponding to from about 1 normal to about 6 normal hydrochloric acid, at a temperature of from about 40° C. to about 70° C., and recovering 5,6-dihydro-1,2-pyran-3-carboxaldehyde from the resultant mixture.

12. A process which comprises heating in the presence of hydroquinone a mixture of acrolein an aqueous solution of a strong mineral acid which solution has an acidity corresponding to from about 1 normal to about 6 normal hydrochloric acid, at a temperature of from about 40° C. to about 70° C., and recovering 5,6-dihydro-1,2-pyran-3-carboxaldehyde from the resultant mixture.

13. In a process for effecting condensation of acrolein in an aqueous medium, the step which comprises heating at a temperature up to about 100° C. a mixture of acrolein and from about 1 to about 7 parts per part of acrolein of an aqueous solution of a strong mineral acid having an acid concentration corresponding to from about 1 normal to about 6 normal, whereby there is produced by condensation of the acrolein in the presence of the aqueous acid solution 5,6-dihydro-1,2-pyran-3-carboxaldehyde.

14. In a process for effecting condensation of acrolein in an aqueous medium, the step which comprises heating a liquid mixture comprising acrolein and an aqueous acidic solution having an acidity corresponding to the acidity of an about 1 normal to an about 6 normal aqueous solution of hydrochloric acid, whereby there is produced by condensation of the acrolein in the presence of the aqueous acidic solution 5,6-dihydro-1,2-pyran-3-carboxaldehyde.

15. In a process for effecting condensation of acrolein in an aqueous medium, the steps which comprise heating at a temperature up to about 100° C. a mixture comprising acrolein and an aqueous solution of acid having an acidity corresponding to the acidity of an about 1 normal to about 6 normal aqueous solution of hydrochloric acid whereby there is produced by condensation of the acrolein in the presence of the aqueous solution of acid 5,6-dihydro-1,2-pyran-3-carboxaldehyde, and recovering said 5,6-dihydro-1,2-pyran-3-carboxaldehyde from the mixture.

16. In a process for effecting condensation of acrolein in an aqueous medium, the step which comprises heating in admixture acrolein and an aqueous acidic solution containing an amount of acid sufficient to maintain the pH of the solution at a value less than about pH 0, whereby there is produced by condensation of the acrolein in the presence of the aqueous acidic solution 5,6-dihydro-1,2-pyran-3-carboxaldehyde.

17. In the preparation of 5,6-dihydro-1,2-pyran-3-methanol, the step of reacting 5,6-dihydro-1,2-pyran-3-carboxaldehyde with an alcoholate of aluminum.

BRADFORD P. GEYER.
ROBERT H. MORTIMER.

REFERENCES CITED

The following references are of record in the file of this patent:

UNITED STATES PATENTS

| Number | Name | Date |
| --- | --- | --- |
| 2,368,186 | Wickert et al. | Jan. 30, 1945 |
| 2,378,996 | Freure | June 26, 1945 |
| 2,387,366 | Touissant | Oct. 23, 1945 |

OTHER REFERENCES

Chem. Abs., 32, 5337, 5398 (1938).
Chem. Abs., 35, 6955, 6956 (1941).
Alder, Chemische Berichte, 74, 920–926, 928 (1941).
Jacques, Ann. Chim. 20, 363–365 (1945).